(12) United States Patent
Lorscheider

(10) Patent No.: US 9,145,029 B2
(45) Date of Patent: Sep. 29, 2015

(54) DOUBLE-STEP OFFSET AXLE

(76) Inventor: Brent Lorscheider, Arcadia, CA (US)

( * ) Notice: Subject to any disclaimer, the term of this patent is extended or adjusted under 35 U.S.C. 154(b) by 591 days.

(21) Appl. No.: 13/456,534

(22) Filed: Apr. 26, 2012

(65) Prior Publication Data

US 2012/0212040 A1    Aug. 23, 2012

Related U.S. Application Data

(63) Continuation-in-part of application No. 13/068,897, filed on May 23, 2011, now abandoned.

(60) Provisional application No. 61/396,240, filed on May 24, 2010.

(51) Int. Cl.
*B60B 35/00*     (2006.01)

(52) U.S. Cl.
CPC ......... *B60B 35/004* (2013.01); *B60B 2900/911* (2013.01); *Y10T 29/49963* (2015.01)

(58) Field of Classification Search
CPC .... B60B 27/02; B60B 27/023; B60B 35/004; B60B 2900/911
USPC ........ 301/1, 110.5, 124.1, 125, 127; 280/276, 280/277, 279
See application file for complete search history.

(56) References Cited

U.S. PATENT DOCUMENTS

| | | |
|---|---|---|
| 423,051 A | 3/1890 | Haven |
| 456,604 A | 7/1891 | Thompson |
| 605,182 A | 6/1898 | Johnston |
| 1,679,819 A | 8/1928 | Fageol |
| 2,125,568 A | 8/1938 | Huyssen et al. |
| 2,395,230 A | 2/1946 | Lucas |
| 2,428,148 A | 9/1947 | Dawson |
| 2,555,480 A | 6/1951 | Fischer |
| 3,084,950 A | 4/1963 | Rass |
| 3,336,046 A | 8/1967 | Seiling |
| 3,371,944 A | 3/1968 | Daniels |
| 3,521,904 A | 7/1970 | Sheffer |
| 3,647,241 A | 3/1972 | Huyssen |
| 3,717,361 A | 2/1973 | Vanderpool |
| 3,770,295 A | 11/1973 | Sword |
| 3,799,581 A | 3/1974 | Munn |
| 3,817,120 A | 6/1974 | Clay |
| 3,831,977 A | 8/1974 | Osborne et al. |
| 3,971,571 A | 7/1976 | Yoshioka |

(Continued)

FOREIGN PATENT DOCUMENTS

JP         03167094 A       7/1991

OTHER PUBLICATIONS

Rekluse e-Axle™ Brochure, 2012.

(Continued)

*Primary Examiner* — Kip T Kotter

(57) ABSTRACT

A one-piece double-step offset axle with an offset center section located between two eccentric steps is disclosed. The offset center section locates and supports the front wheel and may be adjusted to a plurality of locations relative to the forks by rotating the axle in the fork axle housings before the axle pinch bolts or nuts are tightened. The axle facilitates adjustments to the front wheel location and allows riders, mechanics, and designers to alter the chassis or frame geometry, and thus the manner, in which any given motorcycle or bicycle steers and handles according to personal preference.

10 Claims, 12 Drawing Sheets

(56) References Cited

U.S. PATENT DOCUMENTS

| | | | |
|---|---|---|---|
| 4,082,307 A | 4/1978 | Tait | |
| 4,184,695 A | 1/1980 | Roe et al. | |
| 4,260,170 A | 4/1981 | Terai et al. | |
| 4,421,308 A | 12/1983 | Nagy | |
| 4,565,384 A | 1/1986 | Dehnisch | |
| 4,588,232 A | 5/1986 | Kim et al. | |
| 4,602,822 A | 7/1986 | Kim et al. | |
| 4,624,470 A | 11/1986 | Love | |
| 4,638,881 A | 1/1987 | Morioka et al. | |
| 4,660,683 A * | 4/1987 | Hayashi et al. | 188/18 A |
| 4,755,005 A | 7/1988 | Tsai | |
| 4,756,547 A | 7/1988 | Trema | |
| 4,776,609 A | 10/1988 | Pan et al. | |
| 4,834,412 A | 5/1989 | Trema | |
| 4,875,543 A | 10/1989 | Verkuylen | |
| 4,889,354 A | 12/1989 | Wen | |
| 4,952,196 A | 8/1990 | Chilcote et al. | |
| 4,993,734 A | 2/1991 | Trema | |
| 5,002,295 A | 3/1991 | Lin | |
| 5,165,762 A | 11/1992 | Phillips | |
| 5,233,885 A | 8/1993 | Lin et al. | |
| 5,238,259 A | 8/1993 | Wilson et al. | |
| 5,240,087 A | 8/1993 | Parker | |
| 5,249,847 A | 10/1993 | Lee | |
| 5,363,633 A | 11/1994 | Masaru | |
| 5,413,368 A | 5/1995 | Pong et al. | |
| 5,417,305 A | 5/1995 | Parker | |
| 5,553,878 A | 9/1996 | Davignon et al. | |
| 5,588,662 A | 12/1996 | Fortier | |
| 5,851,165 A | 12/1998 | Wei et al. | |
| 5,967,538 A | 10/1999 | Callaluca et al. | |
| 6,109,635 A | 8/2000 | Maeda et al. | |
| 6,152,472 A | 11/2000 | Woodside | |
| 6,155,370 A | 12/2000 | Iwai et al. | |
| 6,186,918 B1 | 2/2001 | Yoo | |
| 6,230,849 B1 | 5/2001 | Lumpkin | |
| 6,260,869 B1 | 7/2001 | Hanlon et al. | |
| 6,315,071 B1 * | 11/2001 | Gogo | 180/219 |
| 6,371,571 B1 | 4/2002 | Tsan | |
| 6,374,975 B1 | 4/2002 | Schlanger | |
| 6,412,803 B1 | 7/2002 | Lalikyan et al. | |
| 6,474,432 B1 | 11/2002 | Schmidt et al. | |
| 6,485,043 B2 | 11/2002 | Ito et al. | |
| 6,536,550 B2 | 3/2003 | Schmidt et al. | |
| 6,609,721 B2 | 8/2003 | Clift, Jr. | |
| 6,708,999 B1 | 3/2004 | Baltes et al. | |
| 6,904,641 B2 * | 6/2005 | Magoto et al. | 16/19 |
| 6,926,297 B2 | 8/2005 | Czysz | |
| 6,966,571 B2 | 11/2005 | Czysz | |
| 7,125,029 B2 | 10/2006 | Knox et al. | |
| 7,273,259 B2 | 9/2007 | Fukui | |
| 7,347,438 B2 | 3/2008 | Raddin | |
| 7,669,870 B2 | 3/2010 | Eaton | |
| 7,731,214 B2 * | 6/2010 | Laird | 280/279 |
| 8,091,909 B2 * | 1/2012 | Laird | 280/279 |
| 2002/0060441 A1 | 5/2002 | Feng | |
| 2002/0167150 A1 | 11/2002 | Clift | |
| 2004/0140709 A1 * | 7/2004 | Kanehisa | 301/110.5 |
| 2009/0121446 A1 | 5/2009 | Mercat | |

OTHER PUBLICATIONS

White Industries, Fixed/Free Extension Hubs, at <http://sheldonbrown.com/harris/white-hubs.html>, last accessed Mar. 6, 2012.

* cited by examiner

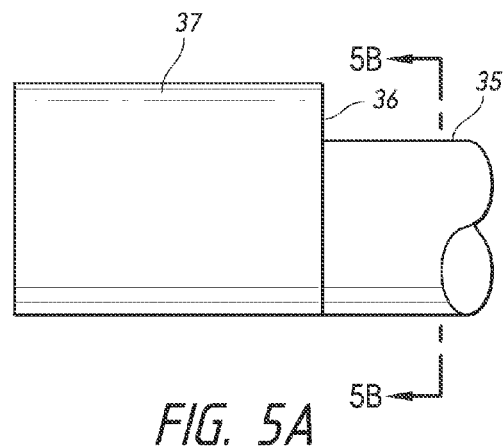
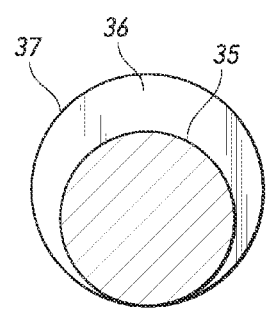
FIG. 5A   FIG. 5B
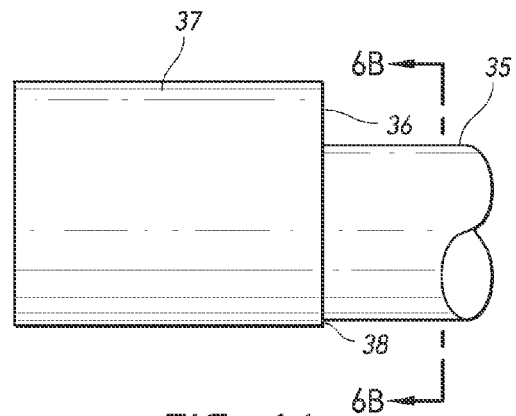
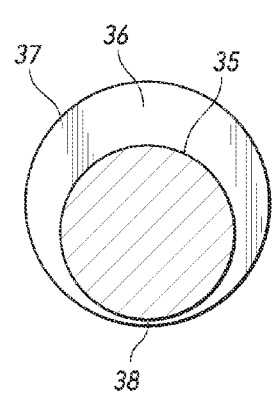
FIG. 6A   FIG. 6B
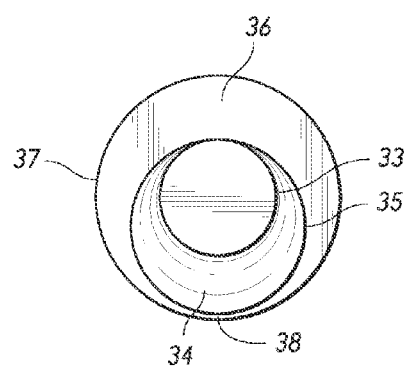
FIG. 7

DOUBLE-STEP OFFSET AXLE

PRIORITY

This application is a continuation-in-part of U.S. application Ser. No. 13/068,897, filed May 23, 2011, and titled, "Double-Step Offset Axle," which claims the benefit of U.S. Provisional Patent Application No. 61/396,240, filed May 24, 2010, and titled "Step-Tapered Offset Axle for Motorcycle Front Wheel," each of which is incorporated by reference in its entirety into this application.

BACKGROUND

Motorcycles frequently use straight or step axles to connect the wheels to the frame or suspension components. Typically, the front wheel suspension components are front forks, while the rear wheel suspension components are swing arms. The three attributes commonly associated with the geometry of the front end of a motorcycle are the trail, the length of the fork, and the rake of the steering stem, also referred to as the steering axis angle or castor. The axis of rotation fixed by the axle is the transverse axis about which the wheel rotates or spins.

The location of the front wheel axis of rotation relative to the steering stem and the rake are significant factors in how a motorcycle handles and steers. Previous methods for changing the front end geometry of motorcycles utilized different offset retrofit triple clamps, adjustable offset triple clamps, fork bottoms with adjustable axle carriers, and adjustable eccentric front motorcycle axles. However, these approaches involve additional manufacturing costs and assembly steps to make adjustments to the front wheel location. They also utilize a multi-piece design that is more difficult to manufacture and service than a one-piece axle.

SUMMARY

The inventive one-piece, double-step offset axle, with an offset center section located between two eccentric steps, embodiments of which are described herein, can be readily manufactured and serviced, and can be installed easily from one side of the wheel. Rotation of the axle in the fork axle housings, before the axle bolt or nut and axle pinch bolts or pinch nuts are tightened, adjusts the location of the offset center section and the front wheel axis of rotation relative to the forks and steering stem. Adjusting the location of the front wheel axis of rotation relative to the forks and steering stem alters the chassis or frame geometry and affects the manner in which any given motorcycle steers and handles. This easily executed adjustment permits riders to easily alter the handling and steering characteristics of a motorcycle to meet their individual preferences.

In one embodiment there is provided an axle design for motorcycles and bicycles that is a one-piece double-step axle with an offset center section that allows the wheel center axis of rotation to be located and secured in a plurality of positions relative to the frame or suspension components. For descriptive purposes only, the embodiments of this invention for the front wheel are presented herein to illustrate how the double-step offset axle might be applied to a motorcycle or bicycle with front forks. The application for the front wheel is most likely to be adopted first because it facilitates adjustments in the handling and steering characteristics to meet individual rider preferences.

In one embodiment there is provided a double-step offset axle with three separate cylindrical sections referred to as the large end, the center section, and the small end. The large end longitudinal axis and the small end longitudinal axis are along the same longitudinal axis while the center section longitudinal axis is offset from and parallel to the large and small end axes. The rotation of the axle about the large end and small end axes causes the offset center section to adjust to a plurality of locations, after which it can be secured in a particular position.

In one embodiment there is provided a method for installation of a one-piece axle by insertion from one side of the motorcycle or bicycle through the first fork, then through the wheel hub and any accompanying spacers or bushings, and lastly into the remaining fork. Removal is accomplished using the reverse steps of installation.

In one embodiment there is provided a design method for different size axle diameters to accommodate commonly produced wheel bearing internal diameters. Examples of these bearing sizes include, but are not limited to, the following internal diameters expressed in millimeters: 20 mm, 22 mm, 25 mm, 28 mm and 30 mm. This invention can also utilize other current or future wheel bearing sizes including those in the metric system, inch system, or any other measurement system.

In one embodiment there is provided a version of a double-step offset axle wherein the large end of the axle floats laterally within the large end fork housing after it is assembled but before the large end axle pinch bolts or nuts are tightened. The floating large end allows the forks to be aligned by compressing them through their strokes several times after which the large end pinch bolts or nuts are tightened.

In one embodiment there is provided a version of a double-step offset axle wherein the large end of the axle is fixed laterally within the large end fork housing before the large end axle pinch bolts or nuts are tightened. This embodiment has a large end cap to apply an axial force to the large end fork when the axle nut or bolt is tightened at the small end fork outer face. This axial force tightly draws the large end fork, the wheel hub, and any bushings or spacers against the small end fork and positions the large end fork relative to the small end fork, after which the small and the large end fork pinch bolts or nuts are tightened.

The present embodiments are directed to motorcycles and bicycles for application to the front wheel, to suspension pivot points, rear wheels, rear axles, swing arms, and other components. The embodiments discussed herein apply to motorcycles and bicycles with front forks and are for illustrative purposes, but do not limit the application of this invention to other applications.

BRIEF DESCRIPTION OF THE DRAWINGS

A more particular description of the present disclosure will be rendered by reference to specific embodiments thereof that are illustrated in the appended drawings. It is appreciated that these drawings depict only typical embodiments of the invention and are therefore not to be considered limiting of its scope. Example embodiments of the invention will be described and explained with additional specificity and detail through the use of the accompanying drawings in which:

FIG. 5A is a close-up side view of a double-step offset axle configured in accordance with one embodiment;

FIG. 5B is a cross-sectional view of the double-step offset axle of FIG. 5A;

FIG. 6A is a close-up side view of a double-step offset axle configured in accordance with one embodiment;

FIG. 6B is a cross-sectional view of the double-step offset axle of FIG. 6A;

FIG. 7 is an end view of a double-step offset axle configured in accordance with one embodiment;

DETAILED DESCRIPTION

Reference will now be made to figures wherein like structures will be provided with like reference designations. It is understood that the drawings are diagrammatic and schematic representations of exemplary embodiments of the present invention, and are neither limiting nor necessarily drawn to scale.

The embodiments described herein relate to the axle used to connect the wheels and wheel hubs to motorcycles and bicycle frames and/or their suspension systems. For descriptive purposes only, the embodiments utilized to connect the front wheel to the front forks are presented to illustrate how the invention proposed herein could be applied to a motorcycle or bicycle and do not limit the application of this invention to other parts of a motorcycle or bicycle.

A one-piece double-step offset axle includes three cylindrical sections referred to herein as the large end, the center section, and the small end. These three sections are separated by two eccentric reductions in diameters or steps referred to as the large end step and small end step. The longitudinal center axis of the large end and the longitudinal center axis of the small end are located on a common longitudinal axis that extends the length of the axle. This is referred to as the ends axis and serves as the axis of rotation for the large end and small end when the axle is located in the fork axle housings.

The large end and small end are located and supported in the large end fork and small end fork housings, respectively, and are secured to the fork by tightening the axle pinch bolts or nuts, which compresses the split housings. The large end includes some shape or form that engages a tool that can be used to apply torque to the large end to either rotate the axle within the fork axle housings, or to secure the axle from rotating from an externally applied torque. The large end also includes a marking on the end to reference the rotated position of the axle with respect to the center section relative to the front forks when viewed from the side. The small end includes either a threaded tip extension for an axle nut, or a threaded hole for an axle bolt.

The center section locates and supports the front wheel bearings and wheel hub. The longitudinal center axis of the center section is referred to as the center axis. The center axis is parallel to and offset from the ends axis. The perpendicular distance between the ends axis and the center axis is referred to as the axle offset.

Figure 1A:
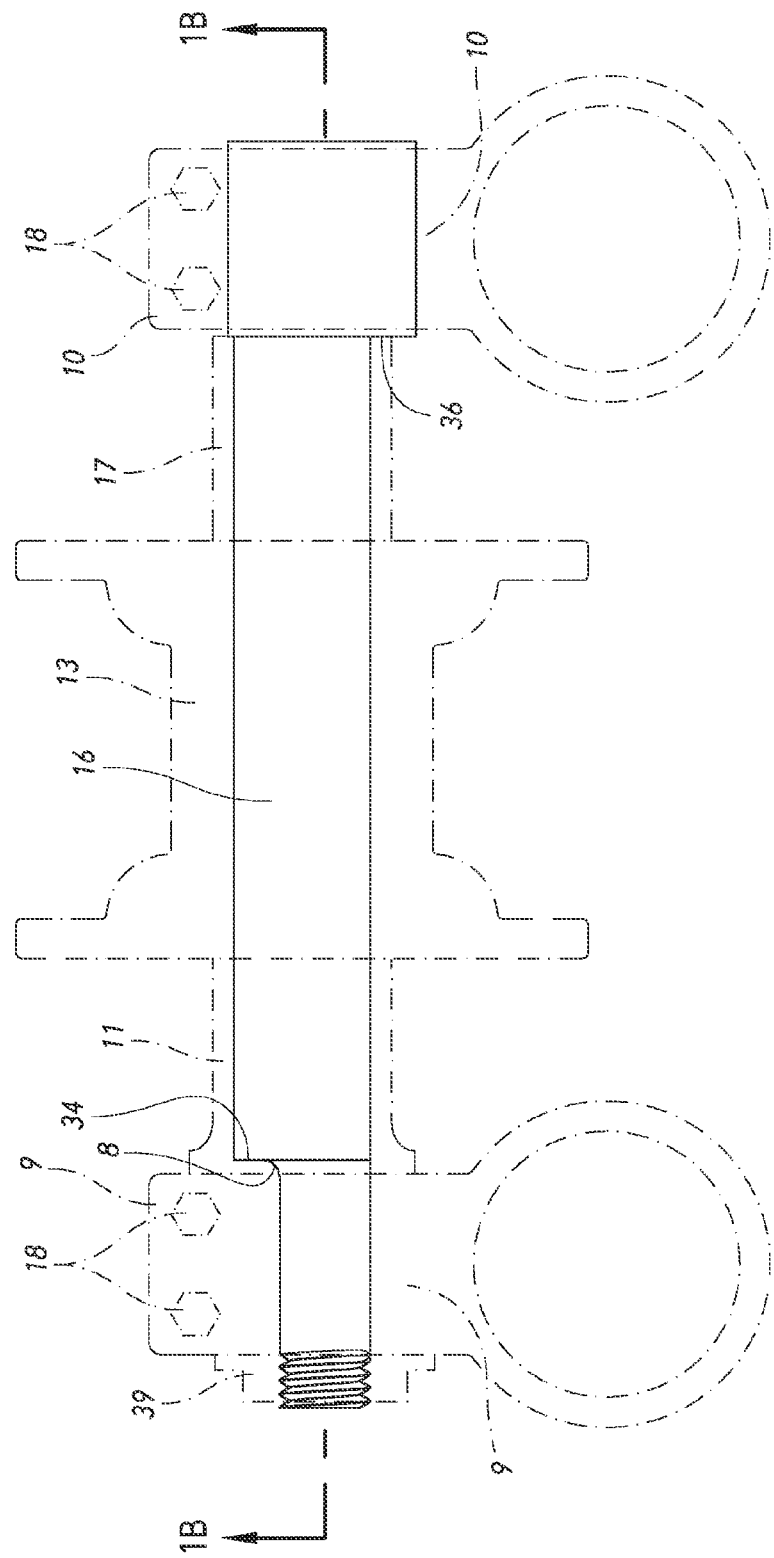
FIG. 1A is a top view of a double-step offset axle configured in accordance with one embodiment.

FIG. 1A shows a top view of the axle as it would be found on an upright motorcycle in a pair of motorcycle front fork bottom ends with the axle rotated to a position where the offset center section is directed forward toward the front of the motorcycle. FIG. 1A shows an axle nut 39, axle pinch bolts or pinch nuts 18, a left fork bottom end 9, the small end step 34, a small end step fillet 8, a small end bushing or spacer 11, a double-step offset axle 16, a wheel hub 13, a large end bushing or spacer 17, a large end step 36, a right fork bottom end 10, and axle pinch bolts or pinch nuts 18. The direction of this view is parallel to the front forks, rake, and steering stem, and the top of this view is oriented toward the front of the motorcycle. A wheel hub 13 is installed on the center section and is centered between the front forks by the small end bushing or spacer 11 and the large end bushing or spacer 17. The small end of the axle is installed in the axle housing in the left fork bottom end 9 and the large end is installed in the axle housing in the right fork bottom end 10. The axle is positioned with the offset center section directed forward toward the front of the motorcycle. The axle is secured by the axle nut 39 and the axle pinch bolts or pinch nuts 18.

Figure 1B:
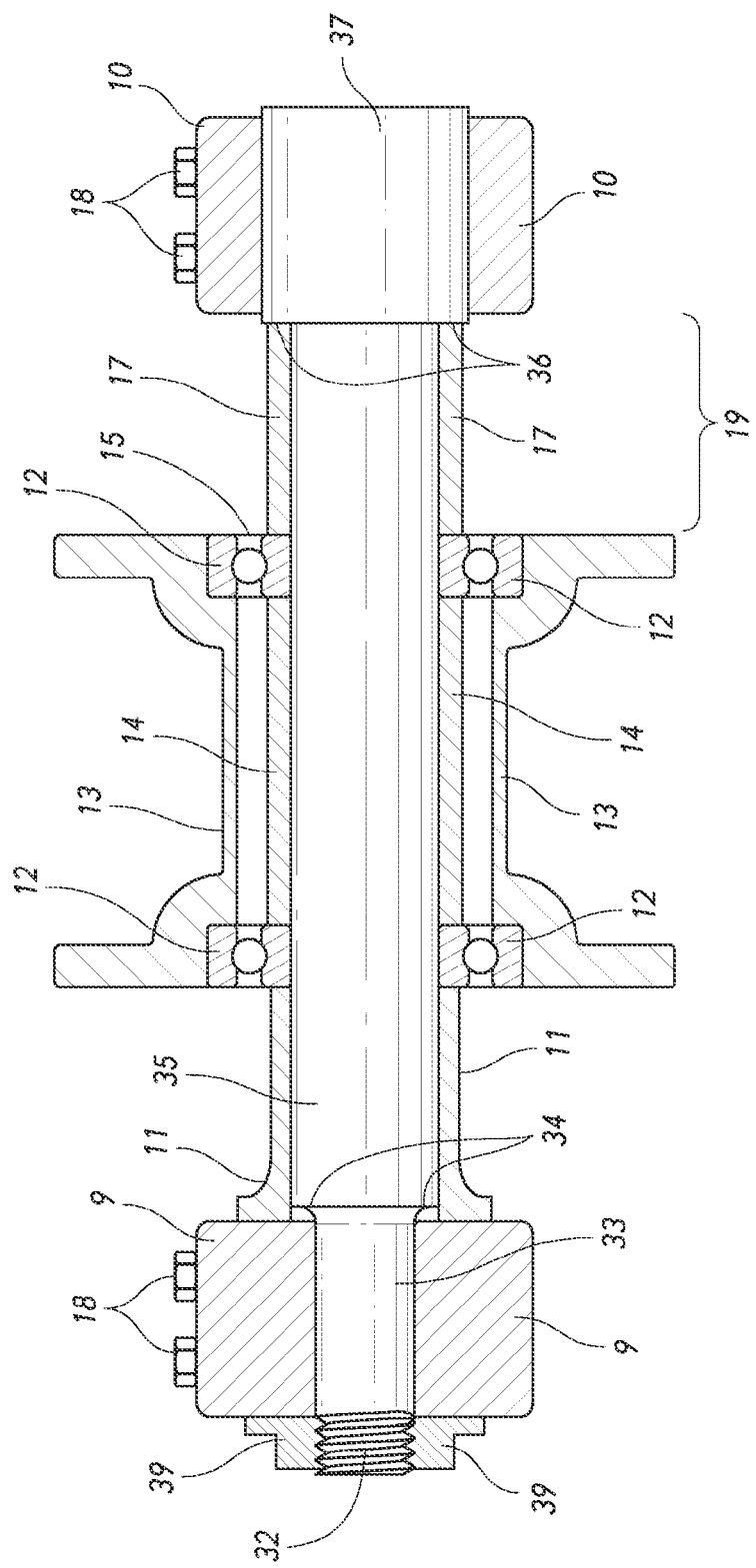
FIG. 1B is a cross-sectional view of a double-step offset axle configured in accordance with one embodiment.

FIG. 1B is a cross-sectional view of FIG. 1A looking forward from the center of the axle. This figure shows a threaded tip 32, an axle nut 39, axle pinch bolts or pinch nuts 18, a left fork bottom end 9, a small end 33, a small end step 34, a center section 35, a small end bushing or spacer 11, wheel bearings 12, a wheel hub 13, a wheel bearing center spacer sleeve 14, a large end wheel bearing face 15, a large end bushing or spacer 17, a large end step 36, a large end 37, a right fork bottom end 10, and axle pinch bolts or pinch nuts 18. For clarity purposes, the axle is shown in outline in order to contrast with the other sections in this figure shown in cross hatches. FIG. 1B also shows the large end step range 19, which is the portion of the axle between the inside face of the right fork bottom end 10, and the large end wheel bearing face 15. This distance represents the possible locations of the large end step.

FIGS. 2A-2H are different views of a double-step offset axle as it would be found in an upright motorcycle with the large end installed in the right front fork bottom. The axle is in the position where the center section 35 is offset toward the bottom. The large end bushing or spacer and the wheel hub shown in FIG. 1A are omitted for clarity purposes. These figures are intended to illustrate the double-step offset concept claimed herein, and are not intended to represent, nor preclude, all possible views of various rotations of the proposed axle within the front fork bottom ends. The minor images of FIGS. 2A, 2B, 2C, 2D, 2E, 2F, 2G, and 2H would show the other primary embodiments of this invention wherein its position would be reversed and the large end 37 would be housed in the left front fork bottom and the small end 33 would be housed in the right front fork bottom.

Figure 2A:
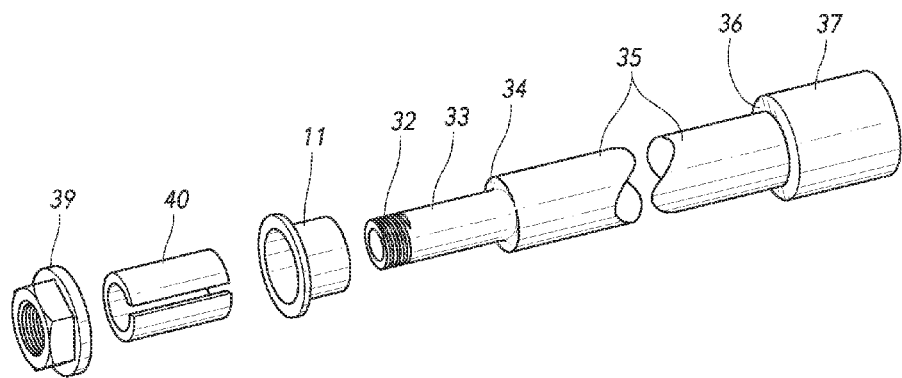
FIG. 2A is a perspective top view of a double-step offset axle configured in accordance with one embodiment.

FIG. 2A is a perspective top view from the left and shows the axle nut 39, the small end bushing or spacer 11, the threaded tip 32, the small end 33, the small end step 34, the center section 35, the large end step 36, and the large end 37. An embodiment may include a slotted bushing 40 to go over the small end 33 and into the small end fork axle housing. The top of this figure is oriented toward the front of the motorcycle.

Figure 2B:
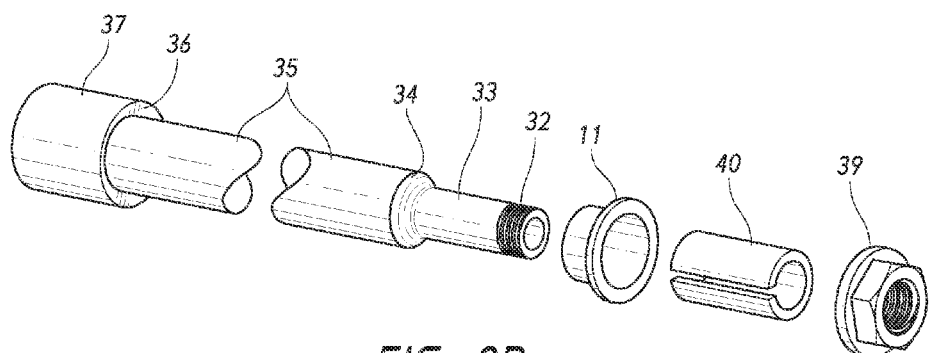
FIG. 2B is a perspective bottom view of a double-step offset axle configured in accordance with one embodiment.

FIG. 2B is a perspective bottom view from the right and shows the large end 37, the large end step 36, the center section 35, the small end step 34, the small end 33, the threaded tip 32, the small end spacer or bushing 11, and the axle nut 39. An embodiment may include a slotted bushing 40 to go over the small end 33 and into the small end fork axle housing. The top of this figure is oriented toward the front of the motorcycle.

Figure 2C:
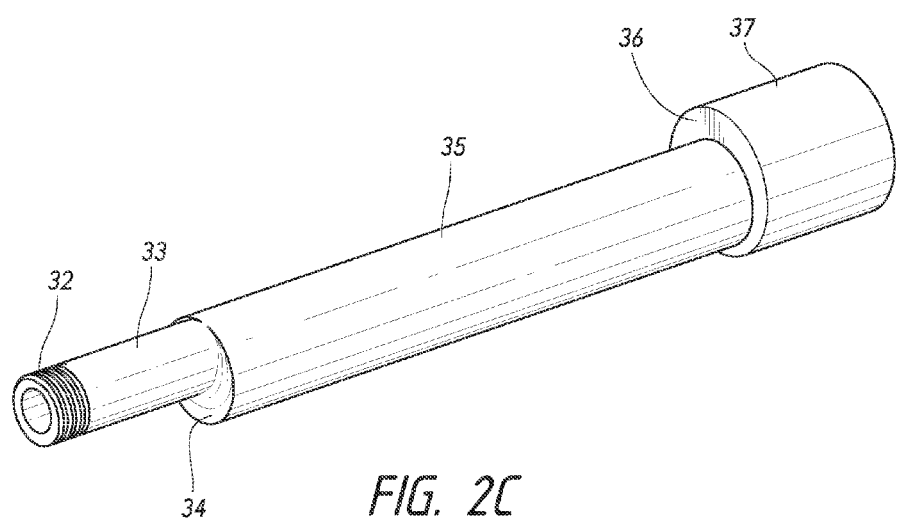
FIG. 2C is a perspective rear view of a double-step offset axle configured in accordance with one embodiment.

FIG. 2C is a perspective rear view from the left and shows the threaded tip 32, the small end 33, the small end step 34, the center section 35, the large end step 36, and the large end 37. The small end bushing or spacer, the axle nut, and the slotted bushing are not shown as they are symmetrical in all views and have already been shown in prior views. The top of this figure is oriented toward the top of the motorcycle.

Figure 2D:
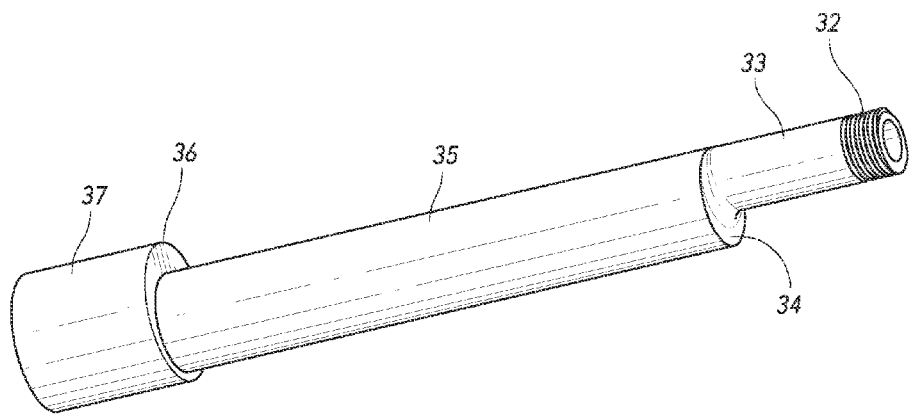
FIG. 2D is a perspective front view of a double-step offset axle configured in accordance with one embodiment.

FIG. 2D is a perspective front view from the right and shows the large end 37, the large end step 36, the center section 35, the small end step 34, the small end 33, and the threaded tip 32. The small end spacer or bushing, the axle nut, and the slotted bushing are not shown as they are symmetrical in all views and have already been shown in prior views. The top of this figure is oriented toward the top of the motorcycle.

Figure 2E:
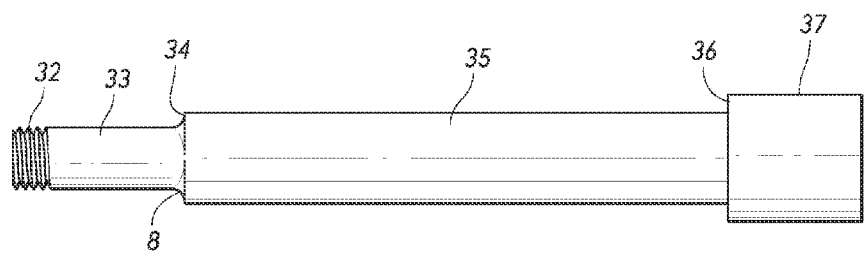
FIG. 2E is a top view of a double-step offset axle configured in accordance with one embodiment.

FIG. 2E is a top view and shows the threaded tip 32, the small end 33, the small end step 34, the small end step fillet 8, the center section 35, the large end step 36, and the large end 37. The top of this figure is oriented toward the front of the motorcycle.

Figure 2F:
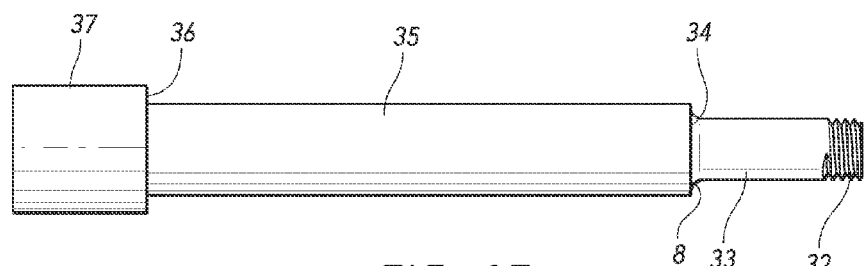
FIG. 2F is a bottom view of a double-step offset axle configured in accordance with one embodiment.

FIG. 2F is a bottom view and shows the large end 37, the large end step 36, the center section 35, the small end step 34, the small end step fillet 8, the small end 33, and the threaded tip 32. The top of this figure is oriented toward the front of the motorcycle.

Figure 2G:
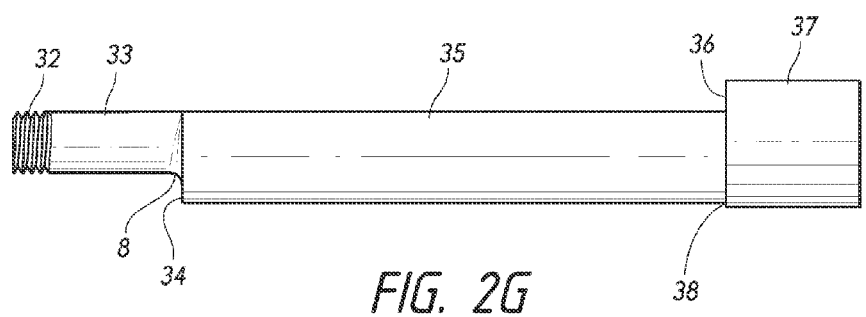
FIG. 2G is a rear view of a double-step offset axle configured in accordance with one embodiment.

FIG. 2G is a rear view and shows the threaded tip 32, the small end 33, the small end step 34, the small end step fillet 8, the center section 35, the large end step 36, the large end 37, and the minor large end step 38. The top of this figure is oriented toward the top of the motorcycle.

Figure 2H:
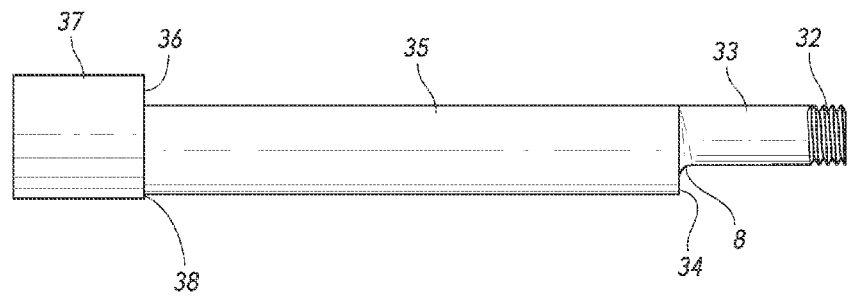
FIG. 2H is a front view of a double-step offset axle configured in accordance with one embodiment.

FIG. 2H is a front view and shows the minor large end step 38, the large end 37, the large end step 36, the center section 35, the small end step 34, the small end step fillet 8, the small end 33, and the threaded tip 32. The top of this figure is oriented toward the top of the motorcycle.

As shown in FIG. 2A and FIG. 2B, the double-step offset axle is comprised of a threaded tip 32, a small end 33, a small end step 34, a center section 35, a large end step 36, and a large end 37. Also shown are axle parts consisting of an axle nut 39 and a small end bushing or spacer 11. Some applications of this embodiment, particularly those applications used to retrofit existing motorcycles with step axles, could include a slotted bushing 40 to go over the small end 33 and into the small end fork axle housing.

Figure 3:
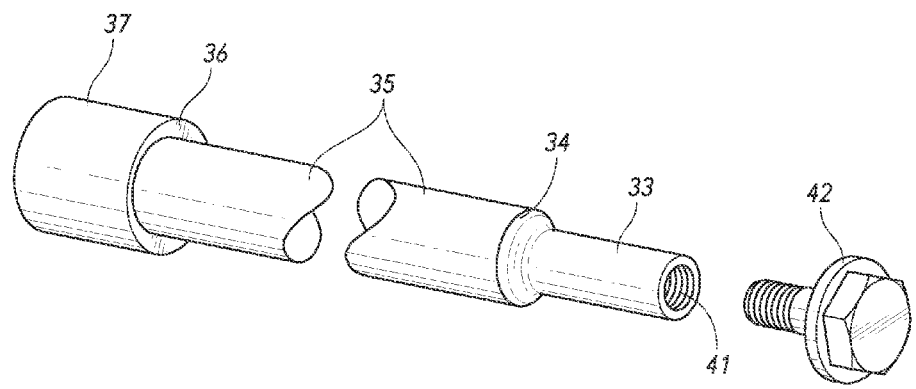
FIG. 3 is a perspective view of a double-step offset axle configured in accordance with one embodiment.

FIG. 3 is a perspective view to illustrate how a bolt and a threaded hole in the small end could be utilized in lieu of the threaded tip and the bolt. The double-step offset axle could utilize a threaded hole in lieu of a threaded tip in which case it would be comprised of the large end 37, the large end step 36, the center section 35, the small end step 34, the small end 33, and the threaded hole 41 in the small end for an axle bolt 42.

Figure 4:
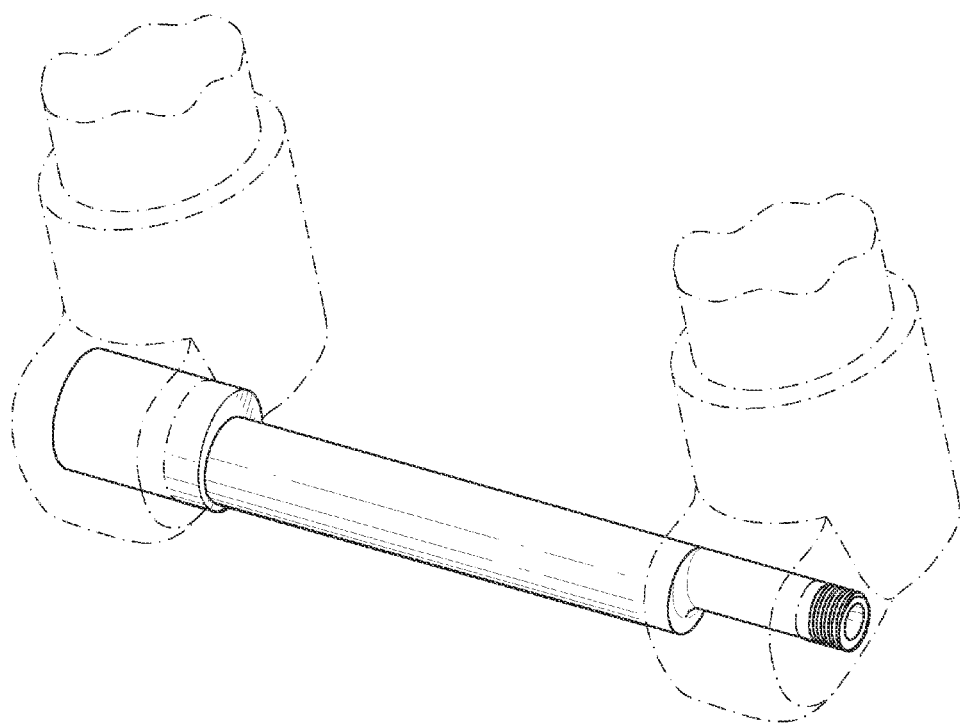
FIG. 4 is a perspective front view of a double-step offset axle configured in accordance with one embodiment.

FIG. 4 is a perspective front view from the right and shows the double-step offset axle housed in a pair of front fork bottom ends. FIG. 5A is a detailed side view of the large end 37, the large end step 36 and the center section 35. FIG. 5B is a section view of FIG. 5A and shows the large end 37, the large end step 36 and the center section 35. FIG. 6A is a detailed side view of the large end 37, the large end step 36, the center section 35 and the minor large end step 38. FIG. 6B is a section view of FIG. 6A and shows the large end 37, the large end step 36, the center section 35, and the minor large end step 38. FIG. 7 is an end view of the axle and shows the large end 37, the large end step 36, the center section 35, the small end step 34, the minor large end step 38, and the small end 33.

The axle can be rotated in the front fork axle housings in the fork bottoms with a tool before the axle pinch bolts or pinch nuts are tightened. The rotation moves the center axis about a circle relative to the front forks when viewed from the side of the forks. This circle has a radius equal to the axle offset and has a center located on the ends axis when viewed from the side. This circle is referred to as the offset circle with a diameter that is equal to twice the axle offset. The diameter of the circle is referred to as the offset range.

In the preferred embodiment the axle can be rotated 360 degrees in the front fork axle housings after the axle and front wheel are assembled but not secured. The axle can then be secured by tightening the fork pinch bolts or nuts fixing the front wheel axis of rotation in a particular position along the offset circle. Each position along the offset circle imposes a unique combination of the following settings on the front end geometry: the trail, the height of the front wheel, and the steering rake, which is sometimes referred to as the steering angle or castor. These settings influence the way a motorcycle or bicycle steers and handles.

In the preferred embodiment the axle is installed and removed from one side of the front forks, which is particularly important in racing and field applications. The axle is installed by inserting the axle, starting with the small end, through the front fork axle housing that houses the large end, then through the wheel hub, and lastly through the remaining fork axle housing which houses the small end. The axle might also pass through bushings or spacers located on either or both sides of the wheel hub to locate and support the wheel hub laterally. An axle nut or an axle bolt is then threaded on, but not tightened, onto or into the small end.

Steering and handling adjustments are accomplished by rotating the axle in the front fork axle housings with a tool that engages the large end pin. The rotation moves the location of the center axis and the front wheel axis of rotation along the offset circle when viewed from the side. Once a desired position along the offset circle is obtained, the axle nut or axle bolt is tightened to partially secure the axle. The forks are then aligned, after which the axle pinch bolts or pinch nuts are tightened thereby pinching the split axle housings together to form rigid and rotationally-resisting connections between the split axle housings and the large and small ends.

The one-piece axle can be made from various suitable materials, such as titanium, steel, or aluminum, and is compatible with commonly produced ball bearing sizes and custom bearing sizes. The axle can also be designed to have a hollow longitudinal center to decrease its weight. The axle is reversible and can be oriented with the large end housed in the right front fork and the small end in the left front fork, or oriented with the large end housed in left front fork and the small end housed in the right front fork provided the two forks are designed accordingly.

The axle design presented herein can be utilized on different motorcycles or bicycles of various sizes and weights by utilizing different diameters and offset distances. Embodiments here present a method of designing a double-step offset axle to optimize the dimensions for achieving a desired offset range given a particular center section diameter. The method initiates with establishing the diameter of the center section, which is equal to the desired wheel bearing internal diameter. Next, the desired offset range is established. The large end diameter is then established and it is equal to or greater than the sum of the center section diameter and the desired offset range. The large end transitions to the center section at the large end step. If the large end diameter is greater than the sum of the center section diameter and the desired offset range, then the large end step is continuous around its circumference and has a minor large end step 38 as shown in FIGS. 6A and 6B. The minor large end step is equal to one-half of the difference between the large end diameter and the sum of the center section diameter and the desired offset range, or:

$$\tfrac{1}{2} \times [\text{large end diameter} - (\text{center section diameter} + \text{desired offset range})].$$

If the large end diameter is equal to the sum of the center section diameter and the desired offset range, then the large end step is not continuous around its circumference and is interrupted at one point. This interruption is shown in FIG. 5B where the diameters of the large end and the center section share a tangency when viewed from the small end of the axle and in FIG. 5A where the side of the large end and side of the center section are located on the same line when viewed from the side perpendicular to the axle offset. This embodiment does not have a minor large end step and the resulting eccentric step could introduce additional bending moments on the axle, in some designs, as the axle nut or axle bolt is tightened.

Utilizing a minor large end step in a laterally floating design will provide a more uniform force to draw the wheel hub and axle spacers, or bushings, against the small end fork when the axle nut or axle bolt is tightened. For illustrative purposes, a minor large end step of 1.0 mm has been used in portions of Table 1, Example Double-Step Offset Axle Dimensions. In addition, a minor large end step has been shown in FIGS. 1-7, except FIGS. 5A and 5B. FIGS. 5A and 5B show an axle with the large end diameter equal to the sum of the center section diameter and the offset range, so a minor large end step is not present in this embodiment. The decision to utilize a minor large end step, and if so, how large the minor step should be, is based on design objectives and preferences.

The large end step can be located laterally approximately anywhere in the large end step range 19 as shown in FIG. 1B. The large end step range is defined as the portion of the axle between the inside of the large end fork and the outside face of the wheel bearing on the large end fork side of the wheel hub. One or more spacers or bushings may be utilized between the large end step and the wheel bearing adjacent to the large end fork. The large end step could also extend to the outside face of the wheel bearing on the large end fork side of the wheel hub, in which case a large end axle bushing or spacer would not be utilized.

Figure 8A:
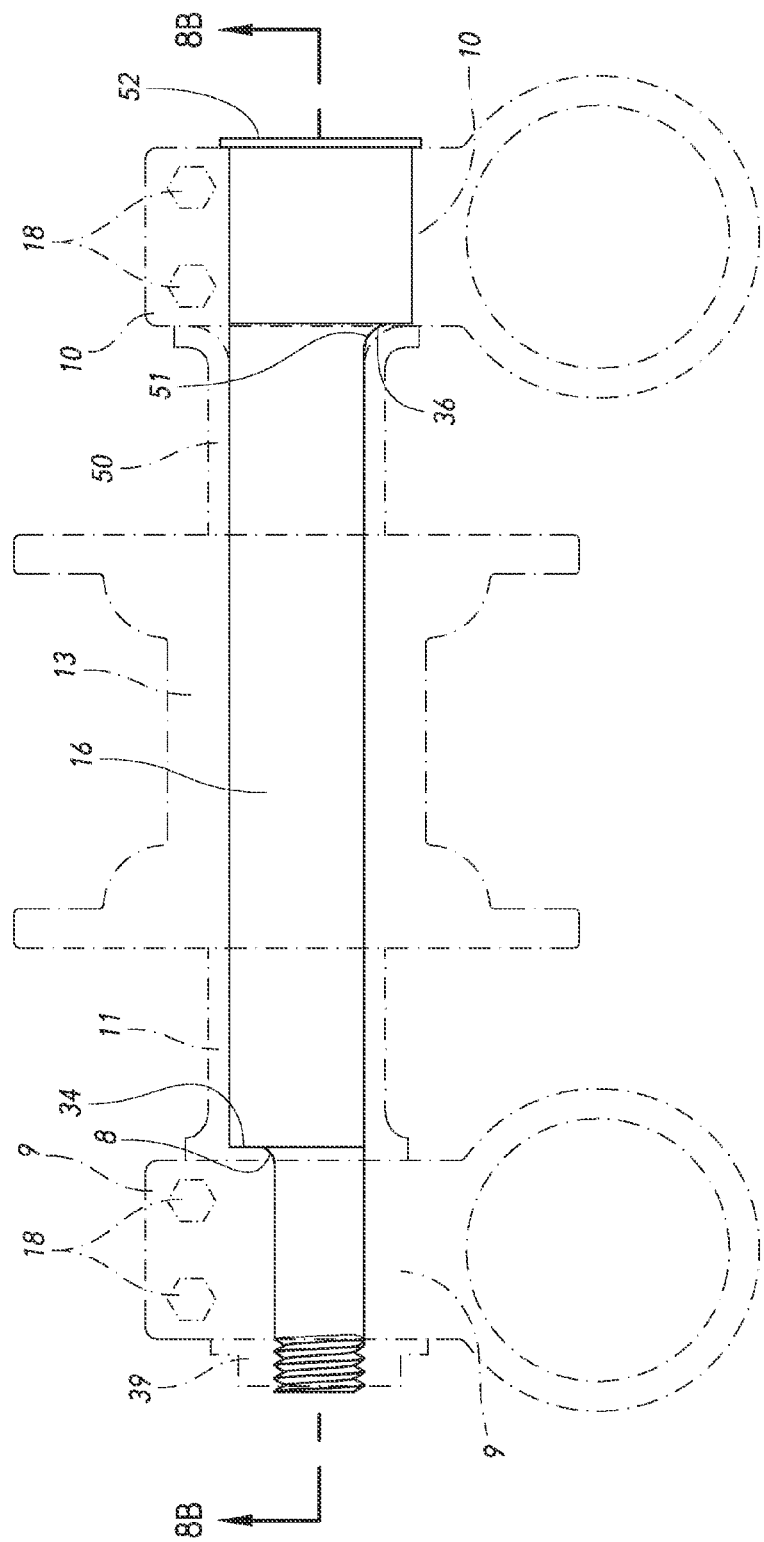
FIG. 8A is a top view of a double-step offset axle configured in accordance with one embodiment.

FIG. 8A shows a top view of the axle as it would be found on an upright motorcycle in a pair of motorcycle front fork bottom ends with the axle rotated to a position where the offset center section is directed forward toward the front of the motorcycle. FIG. 8A shows an axle nut 39, axle pinch bolts or pinch nuts 18, a left fork bottom end 9, the small end step 34, the small end step fillet 8, a small end bushing or spacer 11, the double-step offset axle 16, a wheel hub 13, a large end bushing or spacer with flange 50, the large end step 36, the large end step fillet 51, a right fork bottom end 10, axle pinch bolts or pinch nuts 18, and the large end cap 52. The direction of this view is parallel to the front forks and the top of this view is oriented toward the front of the motorcycle.

A wheel hub 13 is installed on the center section and is centered between the front forks by the small end bushing or spacer 11, and the large end bushing or spacer with flange 50. The small end of the axle is housed in the left fork bottom end 9 and the large end is housed in the right fork bottom end 10. The axle is secured by the axle nut 39 and the axle pinch bolts or pinch nuts 18.

Figure 8B:
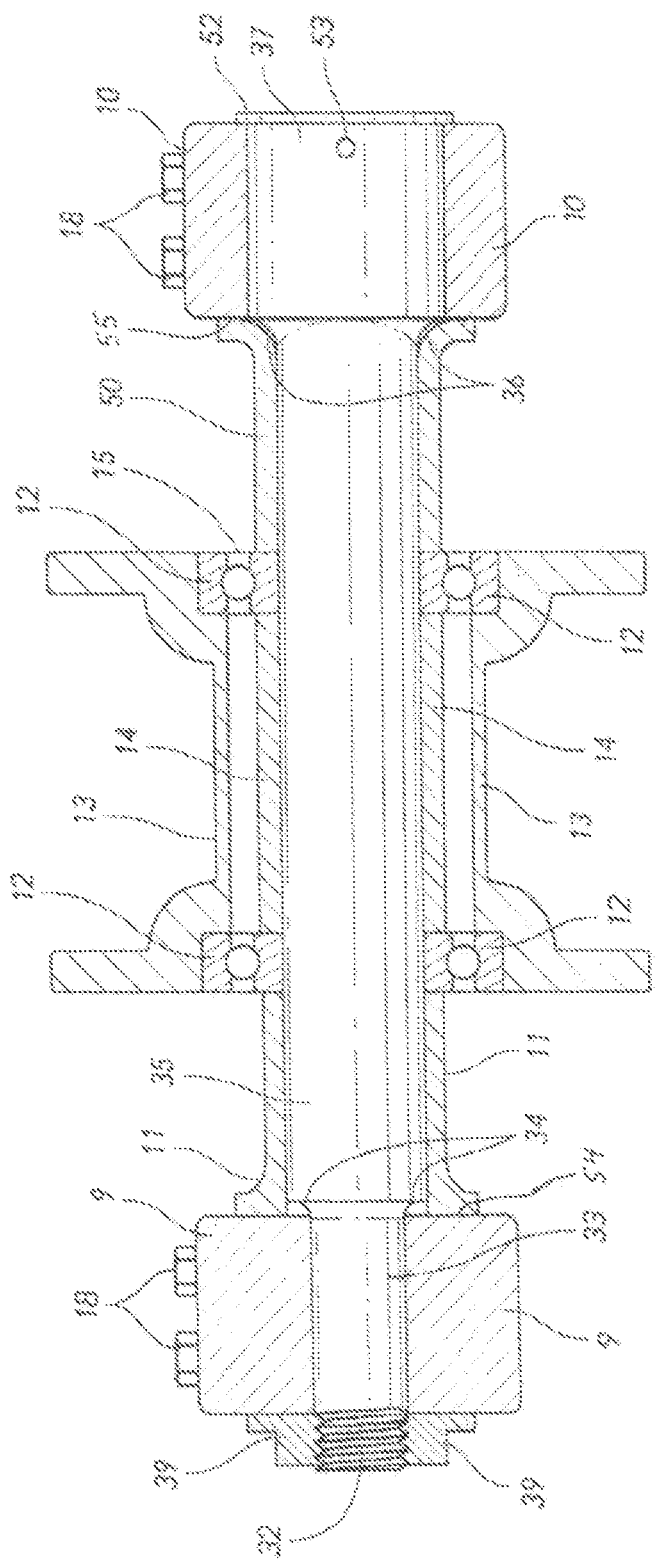
FIG. 8B is a cross-sectional view of a double-step offset axle configured in accordance with one embodiment.

FIG. 8B is a section view of FIG. 8A looking forward from the center of the axle. This figure shows the threaded tip 32, an axle nut 39, axle pinch bolts or pinch nuts 18, a left fork bottom end 9, the small end 33, the small end step 34, a small end flanged bushing or spacer 11, a flange of the small end bushing 54, the center section 35, wheel bearings 12, a wheel hub 13, a wheel bearing center spacer sleeve 14, a large end wheel bearing face 15, a large end flanged bushing or spacer 50, a flange of the large end bushing 55, the large end step 36, a right fork bottom end 10, axle pinch bolts or pinch nuts 18, the large end cap 52, the large end 37, and the large end pin 53. For clarity purposes, the axle is shown in outline in order to contrast with the other sections in this figure shown in cross hatches.

FIGS. 9A-9F are different views of the laterally fixed double-step offset axle as it would be found in an upright motorcycle with the large end installed in the right front fork bottom. The axle is in the position where the center section is directed, or offset, toward the bottom.

Figure 9A:
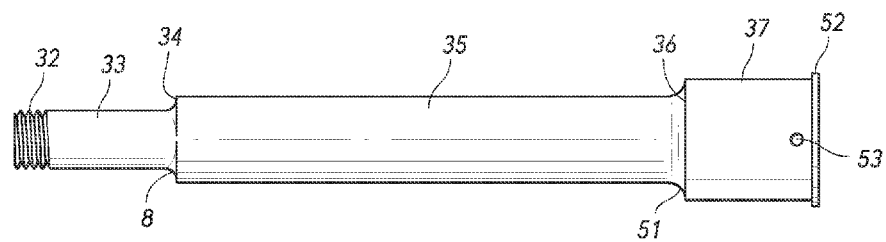
FIG. 9A is a top view of a double-step offset axle configured in accordance with one embodiment.
Figure 9B:
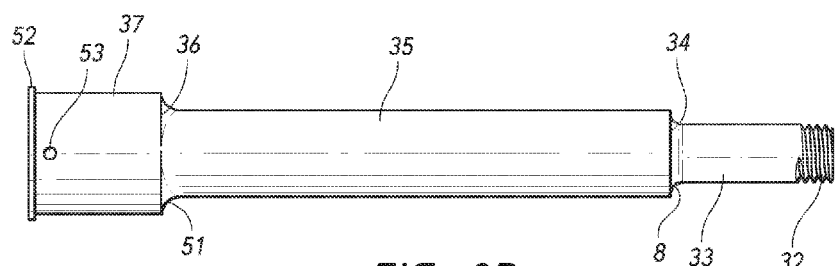
FIG. 9B is a bottom view of a double-step offset axle configured in accordance with one embodiment.
Figure 9C:
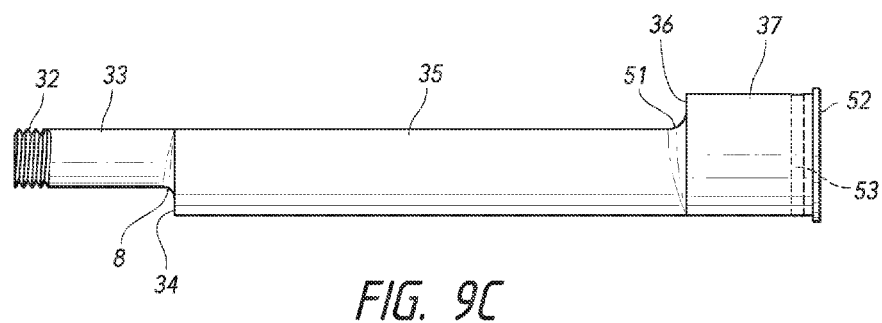
FIG. 9C is a rear view of a double-step offset axle configured in accordance with one embodiment.
Figure 9D:
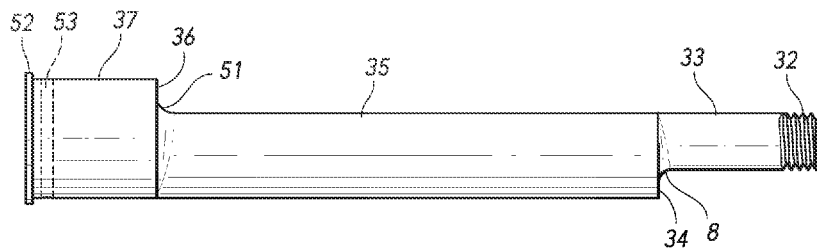
FIG. 9D is a front view of a double-step offset axle configured in accordance with one embodiment.
Figure 9E:
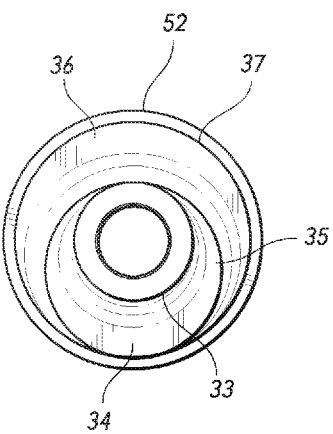
FIG. 9E is an end view of the small end of a double-step offset axle configured in accordance with one embodiment.
Figure 9F:
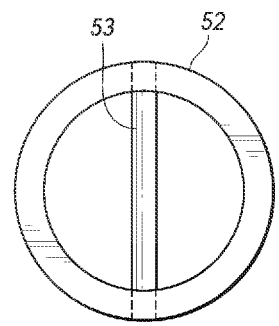
FIG. 9F is an end view of the large end of a double-step offset axle configured in accordance with one embodiment.

FIGS. 9A-9D show the threaded tip 32, the small end 33, the small end step 34, the small end step fillet 8, the center section 35, the large end step 36, the large end 37, the large end cap 52, the large end pin 53 and the large end step fillet 51. FIG. 9E is an end view of the small end and shows the large end step 36, the large end cap 52, the large end 37, the center section 35, the small end 33, and the small end step 34. FIG. 9F is an end view of the large end and shows the large end pin 53, and the large end cap 52.

FIGS. 9A-9D are presented to illustrate the double-step offset concept claimed herein, and are not intended to represent, nor preclude, all possible views of various rotations of the proposed axle within the front fork bottom ends. The minor images of FIGS. 9A-9D would show the other primary applications of this embodiment wherein its position would be reversed and the large end 37 would be housed in the left front fork bottom and the small end 33 would be housed in the right front fork bottom.

Figure 10:
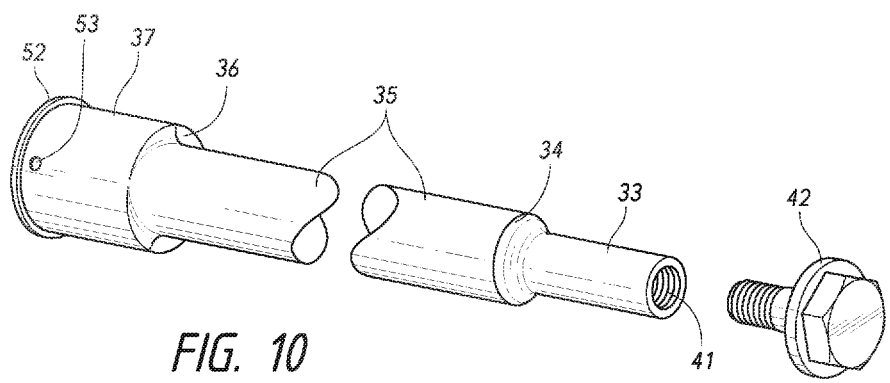
FIG. 10 is a perspective view of a double-step offset axle configured in accordance with one embodiment.

FIG. 10 is a perspective view to illustrate how a bolt and a threaded hole in the small end could be utilized in lieu of the threaded tip and axle nut. FIG. 10 shows the large end cap 52, the large end pin 53, the large end 37, the large end step 36, the center section 35, the small end step 34, the small end 33, the threaded hole 41 and the axle bolt 42.

The axle design presented herein can be utilized on different motorcycles or bicycles of various sizes and weights by utilizing different diameters and offset distances. This invention presents a method of designing a laterally fixed double-step offset axle to optimize the dimensions for achieving a desired offset range given a particular wheel bearing internal diameter. This method begins with establishing the diameter of the center section which is equal to the desired or selected wheel bearing internal diameter. Next, the desired offset range is selected based on designer preferences and limitations.

The large end diameter is then established by adding the desired or selected offset range to the center section diameter. The large end transitions to the center section at the large end step and the large end step is not continuous around its circumference but is interrupted at one point where the circumferences of the large end 37 and the center section 35 share a tangency as shown in FIG. 9E. The large end also has a ridge or rim at the distal end referred to as the large end cap 52 in FIGS. 9A-9E and also includes a shape or form to engage a tool to apply torque to the large end to either rotate the axle within the fork axle housings, or to secure the axle from rotating from an externally applied torque. For illustrative purposes only, engagement for this embodiment utilizes a large end pin 53 fixed transversely across a hollow large end along the direction of the offset which also serves to indicate rotational position of the axle and location of the center section relative to the front forks when viewed from the side.

The large end step is laterally located approximately where the large end fork inner face meets the flange on the large end bushing or spacer. The large end step may have a fillet or other means of tapering to ease the inside corner of the large end step to relieve stress concentrations. The large end bushing or spacer with flange may be relieved on the outer end of the bore to conform closely to any large end fillet. One or more spacers or bushings may be utilized between the large end step and the wheel bearing adjacent to the large end fork. A flanged bushing or spacer 50 engages the large end fork inner face as shown in FIG. 8B and this flange needs sufficient diameter and thickness to effectively bridge and completely engage the large end housing bore in the large end fork.

The small end diameter is then established and it is equal to or less than the difference between the center section diameter and the desired offset range. The center section transitions to the small end at the small end step. As shown in FIG. 1A, the small end step 34 is located approximately where the inside face of the left fork bottom end 9 mates against the small end bushing or spacer 11. A small end step is optional as is a small end fillet to ease the inside corner of the small end step and relieve stress. The decision to have a minor small end step and/or small end fillet is based on design objectives and preferences. The embodiments shown herein do not have a small end step as the small end diameter is equal to the difference between the center section diameter and the desired offset range. Table 1, Example Double-Step Offset Axle Dimensions, shows axles with a minor large end step and other axles without a minor large end step.

An axle bushing or spacer 11 is located on the small end adjacent to the inside of the small end fork as shown in FIG. 1A and FIG. 1B. The flange 54 of the axle bushing or spacer can vary in thickness and diameter according to objectives for the rigidity of the connection between the front forks and the front wheel axle and said flange engages the small end fork.

Current motorcycle axles generally utilize two separate clamping actions to secure the front axle to the forks. The first clamping action is a longitudinal compression force of several thousand pounds along the length of the axle resulting from the axle nut or axle bolt being torqued to about 50-60 ft/lbs. This compression force squeezes everything between the axle head (axle cap) or step and the axle nut or axle bolt at the opposite end. In a laterally fixed axle, both forks, the axle spacers, and the hub are compressed, or clamped, tightly together. In a laterally floating axle, the hub and spacers/bushings are clamped to the small end fork.

The second clamping action comes from tightening the axle pinch nuts, or pinch bolts, and this clamping action squeezes the fork axle housings around the axle ends securely locking them into place and further increasing the rigidity of the connection between the wheel hub and the forks. This clamping also prevents the axle from rotating in the axle housing when the front wheel absorbs impacts.

In the laterally floating axle, the large end step is part of the clamping action and bears indirectly against the wheel hub bearings via the wheel spacers, or bushing, or directly against the wheel hub bearing. The large end step will have this direct or indirect bearing, regardless of where the large end step is located. Further, it is recommended that the large end step have a minor step of about 1 mm in a laterally floating axle design in order to provide uniform bearing around the step.

On the laterally fixed axle, the large end cap applies the axial load to compress the wheel hub and spacers between the two forks. The large end step is not involved in the longitudinal clamping force. The large end step location on the laterally fixed axle should preferably be located near the inside face of the large end fork, but its exact location can vary, as long as the step is not involved in the longitudinal clamping action when the axle nut or axle bolt is torqued. Further, the large end step need not have a minor step since the step is not in a load bearing situation.

In the laterally floating axle, the large end step bears the longitudinal compression load as the large end flanged bushing and small end flanged bushing engage the first and second fork split axle housings respectively. In the laterally fixed axle, the large end cap bears the longitudinal compression load as the large end flanged bushing and small end flanged bushing engage the first and second fork split axle housings, respectively. The actual location of the large end step can vary according to the overall design.

The axle is intended primarily for the design and manufacture of future motorcycles or bicycles, but could also be utilized as a retrofit axle for some bicycles or motorcycles. Some applications of the double-step offset axle, particularly those intended for retrofitting existing motorcycle forks, might require the use of a slotted bushing 40 to go over the small end 33 as shown in FIG. 2A and into the small end fork.

The axle can accommodate commonly manufactured wheel bearing sizes, and can also accommodate future wheel bearing sizes, or special wheel bearing sizes. Commonly produced wheel bearing sizes of possible use include, but are not limited to, the following internal diameters as expressed in millimeters (mm): 20 mm, 22 mm, 25 mm, 28 mm and 30 mm. The double-step offset axle examples described herein for illustrative purposes are grouped together by wheel bearing internal diameter size in millimeters.

Table 1, Example Double-Step Offset Axle Dimensions, shows examples of possible dimensions, in millimeters, for various embodiments of this invention. The table is shown for illustrative purposes only and does not limit the other possible variations of this invention with the multitude of different dimensions possible. All such variations are considered part of this invention, including embodiments that use a larger or smaller minor large end step, embodiments that do not use a minor large end step, and embodiments that use a minor small end step. Table 1 illustrates how larger wheel bearing internal diameters provide a larger offset range than smaller diameters.

TABLE 1

Exemplary Double-Step Offset Axle Dimensions

| Axle Off-set | Offset Range | Large End Diameter | Center Section Diameter | Small End Diameter | Wheel Bearing Internal Diameter | Minor Large End Step |
|---|---|---|---|---|---|---|
| 2.0 | 4.0 | 26 | 20 | 16 | 20 | 1 |
| 2.5 | 5.0 | 27 | 20 | 15 | 20 | 1 |
| 2.5 | 5.0 | 29 | 22 | 17 | 22 | 1 |
| 3.0 | 6.0 | 30 | 22 | 16 | 22 | 1 |
| 3.0 | 6.0 | 33 | 25 | 19 | 25 | 1 |
| 3.0 | 6.0 | 31 | 25 | 19 | 25 | 0 |
| 3.5 | 7.0 | 34 | 25 | 18 | 25 | 1 |
| 4.0 | 8.0 | 35 | 25 | 17 | 25 | 1 |
| 4.0 | 8.0 | 38 | 28 | 20 | 28 | 1 |
| 4.0 | 8.0 | 36 | 28 | 20 | 28 | 0 |
| 5.0 | 10.0 | 40 | 28 | 18 | 28 | 1 |
| 5.0 | 10.0 | 42 | 30 | 20 | 30 | 1 |
| 5.0 | 10.0 | 40 | 30 | 20 | 30 | 0 |
| 6.0 | 12.0 | 44 | 30 | 18 | 30 | 1 |

Although preferred embodiments of this invention have been described above with a certain degree of particularity, those skilled in the art could make numerous alterations to the disclosed embodiments without departing from the spirit or scope of this invention as described in the specification, drawings and claims. Different materials and design details could be used, such as a hollow axle design for weight reduction, without departing from the spirit or scope of this invention as described in the specification, drawings and claims. All references (e.g., large end, middle section, small end, offset, offset range, offset circle, large end fork, small end fork, side, ends axis, center axis, large end step, small end step, large end step range, minor large end step, small end step fillet, bushings and spacers) are only used for identification purposes to aid the reader's understanding of the present invention, and do not create limitations, particularly as to the position, orientation, or use of the invention. Joinder references (e.g., attached, coupled, connected, secured, fixed, and the like) are to be construed broadly and may include intermediate members between a connection of elements and relative movement between elements. As such, such joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the claims.

What is claimed is:

1. An axle for adjustment of a cycle wheel, comprising:
   a large end with a large end step, a large end cap, and a cylindrical shape,
   a center section offset from the large end locates and supports a wheel hub of the cycle wheel, the center section having a cylindrical shape and a small end step, and
   a small end concentric with the large end, the small end having a cylindrical shape with a threaded tip received by an axle nut, wherein:
   the large end and the small end are connected to a split axle housing located at a bottom of each of a first fork and a second fork of a cycle respectively, whereby said housings are pinched together to form direct rigid and rotationally-resisting connections between the respective split axle housings and the large and small ends.

2. The axle of claim 1, wherein the large end and small end are housed in the first fork split axle housing and the second fork split axle housing respectively, wherein the large and small ends are clamped to form rigid connections and rotationally-secured connections between the axle ends and the spilt axle housings of the cycle forks.

3. The axle of claim 2, wherein the large end and small end are directly engaged by and clamped in the first fork split axle housing and second fork split axle housing respectively, with one or more pinch bolts that traverse the splits.

4. The axle of claim 3, wherein rotation of the axle in the first fork split axle housing and second fork split axle housing causes the offset center section to move along a circular path relative to the first and second forks.

5. The axle of claim 4, wherein rotation of the axle, by engagement of the large end, adjusts a cycle wheel hub supported on the center section to a plurality of locations.

6. The axle of claim 5, wherein the large end includes a feature configured to mark the location of the center section relative to the first fork and to engage a tool in order to apply rotational torque, with said feature having a cylindrical form substantially perpendicular to the axle axis.

7. An axle for adjustment of a cycle wheel, comprising:
   a large end housed in a pinchable first fork split axle housing,
   a center section, offset from the large end, that locates and supports a wheel hub of the cycle wheel, and
   a small end, concentric with the large end, housed in a pinchable second fork split axle housing, such that the small end engages the pinchable second fork split axle housing, the small end having a threaded tip received by an axle nut,
   wherein the axle is rotated to a desired position and secured with the axle nut and pinched fork split axle housings.

8. An axle for adjustment of a cycle wheel, comprising:
   a large end with a large end cap, the large end housed in a first fork split axle housing,
   an offset center section that locates and supports a wheel hub of the cycle wheel, and
   a small end concentric with the large end, the small end housed in a second fork split axle housing such that the small end directly engages the second fork split axle housing, said small end having a threaded tip received by a nut,
   wherein the large end cap bears an axial compression load in conjunction with the nut received by the threaded tip.

9. The axle of claim 8 having a large end flanged bushing between the first fork split axle housing and the wheel hub, said flanged bushing having a flange of sufficient diameter to directly engage the large end split axle housing.

10. The axle of claim 8 having a small end flanged bushing between the second fork split axle housing and the wheel hub, said flanged bushing having a flange of sufficient diameter to directly engage the small end split axle housing.

* * * * *